US012261386B2

(12) United States Patent
Minassa et al.

(10) Patent No.: US 12,261,386 B2
(45) Date of Patent: Mar. 25, 2025

(54) AUTO-INSULATING CONCENTRIC WET-MATE ELECTRICAL CONNECTOR FOR DOWNHOLE APPLICATIONS

(71) Applicant: Halliburton Energy Services, Inc., Houston, TX (US)

(72) Inventors: Lorenzzo Minassa, Tomball, TX (US); Marco Antonio dos Santos Fernandes, Macae (BR)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 452 days.

(21) Appl. No.: 17/812,708

(22) Filed: Jul. 14, 2022

(65) Prior Publication Data

US 2023/0131231 A1 Apr. 27, 2023

Related U.S. Application Data

(60) Provisional application No. 63/272,013, filed on Oct. 26, 2021.

(51) Int. Cl.
*E21B 17/02* (2006.01)
*H01R 13/00* (2006.01)
(Continued)

(52) U.S. Cl.
CPC ........... *H01R 13/40* (2013.01); *E21B 17/028* (2013.01); *H01R 13/005* (2013.01); *H01R 13/03* (2013.01); *H01R 43/26* (2013.01); *H01R 13/5219* (2013.01)

(58) Field of Classification Search
CPC .......... E21B 17/02; E21B 17/00; E21B 23/00; E21B 17/028; H01R 13/40; H01R 13/005; H01R 13/03; H01R 43/26; H01R 13/5219
See application file for complete search history.

(56) References Cited

U.S. PATENT DOCUMENTS 4,291,438 A * 9/1981 Seiki ........................ D01H 4/30 19/112
4,997,384 A * 3/1991 Godfrey ................ E21B 23/006 166/66.4
(Continued)

FOREIGN PATENT DOCUMENTS

DE 10216933 7/2003
EP 0010382 4/1980
(Continued)

OTHER PUBLICATIONS

International Search Report and Written Opinion, PCT/US2022/073749, Nov. 3, 2022, 10 pages.
(Continued)

*Primary Examiner* — Yong-Suk (Philip) Ro
(74) *Attorney, Agent, or Firm* — Kilpatrick Townsend & Stockton LLP

(57) ABSTRACT

A wet-mate connector assembly can include a male portion having a male electrical contact with a valve metal alloy thereon. The wet-mate connector assembly can also include a female portion having a female electrical contact with the valve metal alloy thereon. The female portion can receive the male portion for defining a fluid flow path therein and can form an electrical connection with the male portion. The valve metal alloy can respond to an electrical charge and a downhole fluid by forming an insulation layer on at least one of the male electrical contact or the female electrical contact in a downhole of a well.

20 Claims, 8 Drawing Sheets

(51) Int. Cl.

| | |
|---|---|
| ***H01R 13/03*** | (2006.01) |
| ***H01R 13/40*** | (2006.01) |
| ***H01R 43/26*** | (2006.01) |
| *H01R 13/52* | (2006.01) |

(56) References Cited

U.S. PATENT DOCUMENTS 8,485,837 B2 * 7/2013 Head ..................... E21B 17/028 439/190
9,028,264 B2 * 5/2015 Head .................... H01R 13/523 439/190
9,197,006 B2 11/2015 Hack
9,728,880 B2 8/2017 Ejiri et al.
9,893,460 B2 2/2018 Windgassen et al.
10,411,379 B2 9/2019 Wagman et al.
10,461,452 B2 10/2019 Curran et al.
10,868,384 B1 12/2020 Windgassen et al.
10,985,495 B1 4/2021 Hack et al.
11,005,390 B2 5/2021 Windgassen et al.
11,038,594 B1 6/2021 Claycomb et al.
11,069,995 B1 7/2021 Hack et al.
11,075,486 B1 7/2021 Hack et al.
2015/0340803 A1 * 11/2015 Li ...................... H01R 13/4538 439/141
2017/0204680 A1 * 7/2017 Leismer ............. H01R 13/5219
2019/0148861 A1 * 5/2019 Ross ................... E21B 17/0285 166/65.1
2020/0080388 A1 * 3/2020 Leismer ................ E21B 47/008
2021/0249805 A1 8/2021 Hack et al.
2022/0034170 A1 * 2/2022 Lafleur ................... E21B 34/06

FOREIGN PATENT DOCUMENTS

GB 2001807 2/1979
WO 03067683 8/2003
WO 2008024809 A1 2/2008

OTHER PUBLICATIONS

Northrop Grumman, “NiobiCon Wet-Mate Electrical Connector”, available at https://www.northropgrumman.com/what-we-do/sea/niobicon-wet-mate-electrical-connector/ at least as early as Aug. 9, 2021, 6 pages.
Song et al., “An Overview of Underwater Connectors”, Journal of Marine Science and Engineering, vol. 9, Issue 8, Jul. 27, 2021, pp. 1-22.

* cited by examiner

AUTO-INSULATING CONCENTRIC WET-MATE ELECTRICAL CONNECTOR FOR DOWNHOLE APPLICATIONS

CROSS-REFERENCE TO RELATED APPLICATION

This claims priority to U.S. Provisional Application No. 63/272,013, filed Oct. 26, 2021 and titled "Auto-Insulating Concentric Wet-Mate Connector Assembly for Downhole Applications," the contents of which are incorporated herein by reference.

TECHNICAL FIELD

The present disclosure relates generally to completion operations for a wellbore and, more particularly (although not necessarily exclusively), to a wet-mate connector assembly for downhole power transmission for a completion operation.

BACKGROUND

A wellbore can be a hole that can be drilled into a subterranean formation. After the wellbore has been drilled, the wellbore can be completed to extract natural resources, such as oil, gas, or water from the wellbore. Completing the wellbore can involve running production tubing, electrical lines, and downhole tools into the wellbore. The wellbore may contain one or more downhole fluids, such as water, drilling fluid, formation fluid, oil, mud, or brine. A wet-mate connector assembly can make an electric connection in fluid in the wellbore or in a subsea environment with respect to a wellbore. Wet-mate connector assemblies can provide electricity and data communications to equipment installed in wet environments in or around the wellbore. For instance, a control line can be run from the surface into the wellbore. The control line can include an electric line that can be used to enable command and control signals to be sent from a location on the surface to equipment, such as downhole tool, that may be positioned in the wellbore. A wet-mate connector assembly may form an electrical connection between the control line and the equipment. Wet-mate connector assemblies can be disconnected and reconnected in a wet environment to allow for redressing or servicing of the wet-mate connector assemblies or tools coupled to the wet-mate connector assemblies.

DETAILED DESCRIPTION

Figure 1:
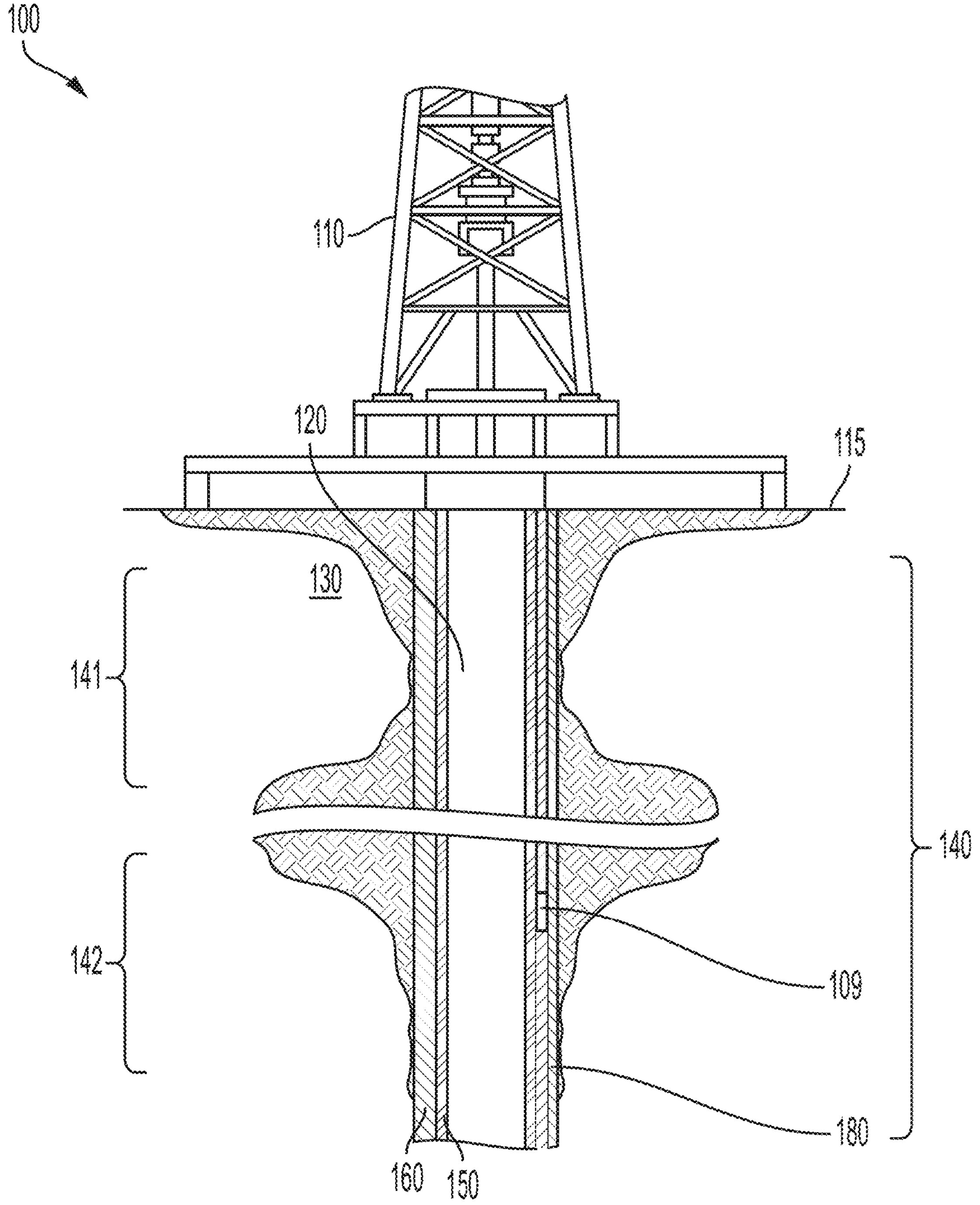
FIG. 1 is a schematic view of a well system that includes a wet-mate connector assembly according to one example of the present disclosure.

Certain aspects and features of the present disclosure relate to a wet-mate connector assembly that includes a valve metal alloy for insulating the wet-mate connector assembly for downhole applications. The valve metal alloy can be an auto-insulating material that can form an insulation layer when voltage is applied across an electrical contact. By applying a voltage to the valve metal alloy when the wet-mate connector assembly is positioned downhole in the wellbore and immersed in downhole fluid, an insulation layer can form around the valve metal alloy. The insulation layer can prevent the downhole fluid from interfering with the electrical connection formed by the wet-mate connector assembly.

In some examples, the valve metal alloy can enable the wet-mate connector assembly to operate at higher voltages without short-circuiting. For example, the valve metal alloy can prevent high voltage components of the wet-mate connector assembly from causing electrical currents to flow from the wet-mate connector assembly to the downhole fluid by forming the insulation layer around exposed, electrically charged portions of the wet-mate connector assembly. In some examples, the thickness of the insulation layer can be proportional to an applied voltage. Generating the insulation layer with thickness proportional to the applied voltage can provide additional resistance to electrically charged portions of the wet-mate connector assembly that may be held at a higher voltage with respect to the downhole fluid. The valve metal alloy's auto-insulating properties can enable the wet-mate connector assembly to operate with few or no elastomeric seals. This may enable the wet-mate connector assembly to operate at high temperatures and pressures without short-circuiting, as, unlike elastomeric seals, the valve-metal alloy may not be prone to temperature-induced or pressure-induced failure. The insulation layer may also be resistant to corrosion due to gases that may be present in the wellbore, such as hydrogen sulfide.

By forming the insulation layer, the valve metal alloy can enable the wet-mate connector assembly to self-isolate with respect to the downhole fluid. Self-isolation may involve preventing undesired stray current paths from forming in the wet-mate connector assembly. The insulation layer can provide a high dielectric strength, which can protect the wet-mate connector assembly from being corroded by downhole fluids that have contacted the connector assembly, increase the system's insulation resistance by preventing short-circuits, and improve the lifetime expectancy of the equipment. The wet-mate connector assembly can also enable multiple reconnections due to the ability of the valve metal alloy to self-heal the insulation layer, resist brine, and prevent water contamination.

In one example, the wet-mate connector assembly can make an electrical connection underwater in a wellbore or subsea environment. The wellbore may include fluids, such a water or brine that may corrode or short-circuit exposed electrically conducting components. The wet-mate connector assembly may prevent short-circuiting and corrosion with a valve metal alloy layered on top of a male electrical contact and a female electrical contact used to create the electrical connection. When the wet-mate connector assembly is positioned downhole in a well and immersed in a brine or downhole fluid, the valve metal alloy can respond to an applied electrical charge and exposure to a downhole fluid by forming an insulation layer on the male electrical contact, the female electrical contact, or both. The valve metal alloy can provide the wet-mate connector assembly with increased corrosion resistance by forming the insulation layer around exposed components that may be otherwise susceptible to corrosion due to downhole fluids. For example, if the insulation layer is damaged, the valve metal alloy can re-generate the insulation layer. The self-healing properties of the valve metal alloy can also enable the wet-mate connector assembly to be connected and disconnected multiple times without compromising the insulation resistance of the wet-mate connector assembly.

In some examples, the wet-mate connector assembly can form the electrical connection by inserting a male portion into a female portion of the wet-mate connector assembly. Inserting the male portion into the female portion may also create a fluid flow path in the center of the wet-mate connector assembly. The male portion can have a male electrical contact with the valve metal alloy thereon and the female portion can have a female electrical contact with the valve metal alloy thereon. The female electrical contact can be sized to receive the male electrical contact. The insulation layer can be a product of a chemical reaction between the downhole fluid, the valve metal alloy, and the electric charge. For example, the chemical reaction can be an oxidation reaction that can transform the outermost layer of the valve metal alloy contacting the downhole fluid into an oxidized insulation layer.

In another example, a wet-mate connector assembly can include an inner core made of a more conductive, non-auto-insulating material with a valve metal alloy thereon. For example, the inner core can be surrounded by an outer shell made of the valve metal alloy. This can allow the wet-mate connector assembly to transmit electricity with a higher conductivity through the inner core while still retaining the auto-insulating properties of the valve metal alloy in the outer shell. In some examples, the wet-mate connector assembly can include elastomeric seals for further insulating parts of the wet-mate connector assembly.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic view of a well system 100 according to one example of the present disclosure. The well system 100 includes an exemplary operating environment in which the apparatuses, systems and methods disclosed herein may be employed. For example, the well system 100 can include a control line 180 according to any of the embodiments, aspects, applications, variations, or designs disclosed in the following paragraphs. The well system 100 can include a workover and/or drilling rig 110 that can be positioned above the earth's surface 115 and can extend over and around a wellbore 120 that can penetrate a subterranean formation 130 for the purpose of recovering hydrocarbons. The subterranean formation 130 can be located below exposed earth, as shown, as well as areas below earth covered by water, such as ocean or fresh water. Some aspects of the present disclosure may be particularly suited for subterranean formations 130 located below the earth covered by water. As those skilled in the art appreciate, the wellbore 120 can be fully cased, partially cased, have multiple concentric wellbore tubulars, or an open hole wellbore. The casing can also be a liner that extends partway to the surface.

The wellbore 120 may be drilled into the subterranean formation 130 using any suitable drilling technique. In the example illustrated in FIG. 1, the wellbore 120 extends substantially vertically away from the earth's surface 115. Notwithstanding, in other embodiments the wellbore 120 could include a vertical wellbore portion, deviate from vertical relative to the earth's surface 115 over a deviated wellbore portion, and then transition to a horizontal wellbore portion. In alternative operating environments, all or portions of a wellbore 120 may be vertical, deviated at any suitable angle, horizontal, and/or curved. The wellbore 120 can be a new wellbore, an existing wellbore, a straight wellbore, an extended reach wellbore, a sidetracked wellbore, a multi-lateral wellbore, or any other type of wellbore for drilling, completing, or the production of one or more zones. Further, the wellbore 120 may be used for both producing wells and injection wells. In accordance with the disclosure, the wellbore 120 may include a wellbore tubular 150. The wellbore tubular 150 can be wellbore casing that is held in place by cement 160 in the cased region 140. In some embodiments, the wellbore tubular 150 can be production tubing, a liner, the wellbore itself, or any other type of tubular that can be located within a wellbore.

The well system 100 can include the control line 180. For example, the control line 180 might extend within the wellbore 120 from the surface. A wet-mate connector assembly 109 may enable a portion of the control line 180 positioned in an uphole region 141 of the wellbore 120 to form an electrical connection with a portion of the control line 180 positioned in a downhole region 142 of the wellbore 120. The wet-mate connector assembly 109 can include a valve metal alloy that can form an insulation layer around electrically charged portions of the wet-mate connector assembly 109 that may have been exposed to downhole fluids.

Figure 2:
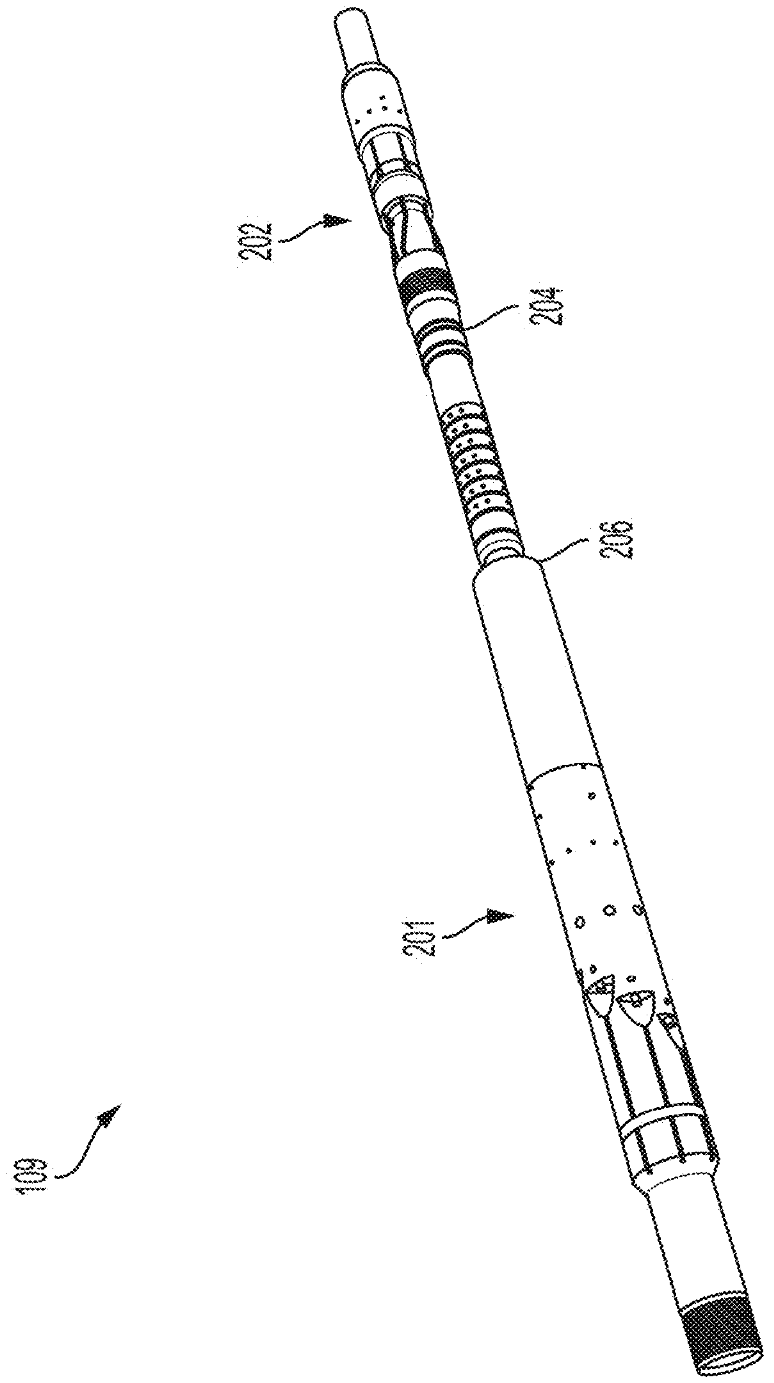
FIG. 2 is a perspective view of a wet-mate connector assembly according to one example of the present disclosure.

FIG. 2 is a perspective view of the wet-mate connector assembly 109, according to one example of the present disclosure. The wet-mate connector assembly 109 can be used to form an electrical connection between an uphole line and a downhole line. For example, the uphole line may be electrically coupled to surface equipment. The downhole line may be electrically coupled to a downhole tool. Forming an electrical connection between the uphole line and the downhole line can enable a transmission of data, power, or both among the surface equipment and the downhole tool, such as between regions of the control line 180 depicted in FIG. 1. The wet-mate connector assembly 109 can include a male portion 202 and a female portion 201. In some examples, the uphole line can be coupled to male portion 202, and the downhole line can be coupled to the female portion 201, or vice versa. The male portion 202 can be inserted into the female portion 201 such that the male portion 202 and the female portion 201 mechanically engage to form the electrical connection.

The male portion 202 and the female portion 201 can include a valve metal alloy 204. For example, the male portion 202 may include a male electrical contact with a valve metal alloy 204 thereon, and the female portion 201 may include a female electrical contact with valve metal alloy 206 thereon. The valve metal alloys 204 and 206 can be an auto-insulating material that can cause a chemical reaction when in contact with downhole fluids in the wellbore 102 and an applied voltage. Examples of the valve metal alloys 204 and 206 can include tantalum, niobium, niobium oxide, an electrically conductive ceramic, niobium pentoxide, a material that can passivate to niobium pentoxide, or any combination thereof. The chemical reaction between the valve metal alloy 206, the downhole fluids, and the applied voltage can form an insulation layer that can insulate the valve metal alloys 204 and 206 to prevent the wet-mate connector assembly 109 from short-circuiting. The male portion 202 and the female portion 201 may also define a fluid flow path. For example, the fluid flow path may be a tubular region that is partially encapsulated by the male portion 202. The fluid flow path can run through the wet-mate connector assembly 109, and can be used for pumping fluids into the wellbore or extracting fluids from the wellbore. The male portion 202 may be insulated from the tubular region via a male connector mandrel.

Figure 3:
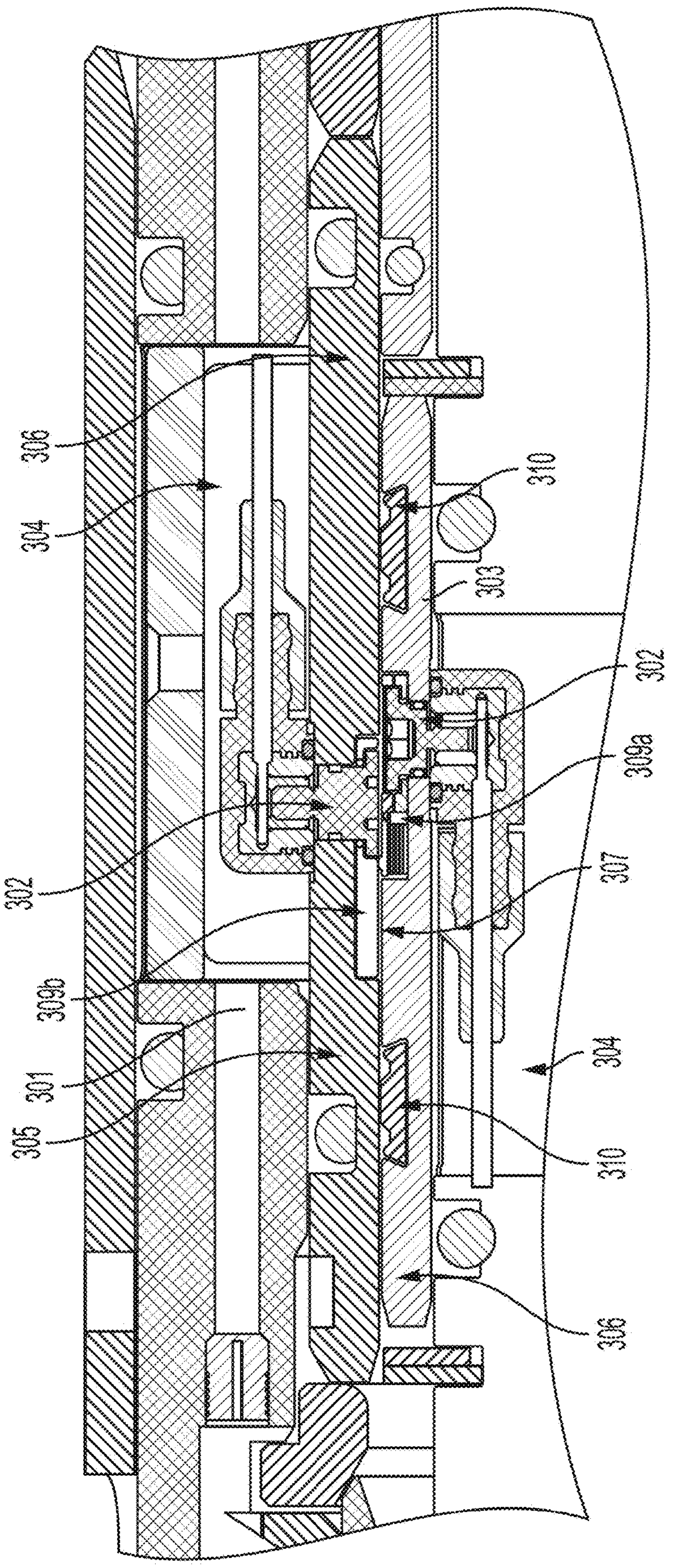
FIG. 3 is a cross-sectional diagram of a wet-mate connector assembly according to one example of the present disclosure.

FIG. 3 is a cross-sectional diagram of a wet-mate connector assembly 109, according to one example of the present disclosure. The wet-mate connector assembly 109 can include a male portion 303 and a female portion 305 which can include one or more electrical contacts. In some examples, a first electrical contact on the male portion 303 can function as a male electrical contact 309*a* and a second electrical contact on the female portion 305 can function as a female electrical contact 309*b*. The male electrical contact 309*a* and female electrical contact 309*b* can be fastened by one or more contact screws 302. In some examples, a contact chamber 307 can be defined as the area between the male electrical contact 309*a* and the female electrical contact 309*b* in which contact is made.

In some examples, the male electrical contact 309*a* and female electrical contact 309*b* can be contact rings that are concentric with respect to each other. For example, an outer diameter of a male electrical contact ring may be sized to contact an inner diameter of a female electrical contact ring. The contact screws 302 may be fastened to increase a pressure between the male electrical contact ring and the female electrical contact ring. Increasing the pressure between the male electrical contact ring and the female electrical contact ring may increase a sealing pressure within the contact chamber 307. Portions of the one or more contact screws 302 can be housed in one or more pressure compensation chambers 304. The pressure compensation chambers 304 may include one or more fluids. The pressure compensation chambers 304 may apply a pressure to the contact screws 302 to further increase the sealing pressure within the contact chamber 307. Maintaining the sealing pressure within the contact chamber 307 can reduce a fluid ingress into the contact chamber 307. In some examples, the contact chamber 307 can be insulated by one or more insulator bands 306. For example, the insulator bands 306 can be insulator substratum layers. The insulator bands 306 can house and provide insulation to electrical components in the wet-mate connector assembly 109.

An electrical connection can be created between the male portion 303 and the female portion 305 in the contact chamber 307 due to mechanical interference of the one or more electrical contacts 309*a-b*. The male electrical contact 309*a* and the female electrical contact 309*b* can be electrically and mechanically coupled to an electric line by the one or more contact screws 302. In some examples, the electric line can be the control line 180. The contact screws 302 can be a conductive material, such as a metal, and can enable a flow of current between the electrical contacts 309*a-b*. The contact screws 302 can be housed within the insulator bands 306. In some examples, the wet-mate connector assembly 109 can include a contact chamber seal 310 that can reduce an ingress of downhole fluids into the contact chamber 307. In some examples, the contact chamber seal 310 can be an elastomeric seal. In some examples, the contact chamber seal 310 can mechanically engage with one or more of the insulator bands 306. The one or more contact screws 302, the male electrical contact 309*a* and female electrical contact 309*b*, or both the contact screws 302 and the male electrical contact 309*a* and female electrical contact 309*b* can include the valve metal alloy that can generate an insulation layer to prevent a short circuit in the wet-mate connector assembly 109. By preventing short circuits, the valve metal alloy may enable the wet-mate connector assembly 109 to operate at higher voltages and increase an operational lifespan of the wet-mate connector assembly 109. In some examples, the male electrical contact 309*a* and female electrical contact 309*b* may include a conductive material that can be encapsulated by an outer shell of the valve metal alloy.

Figure 4:
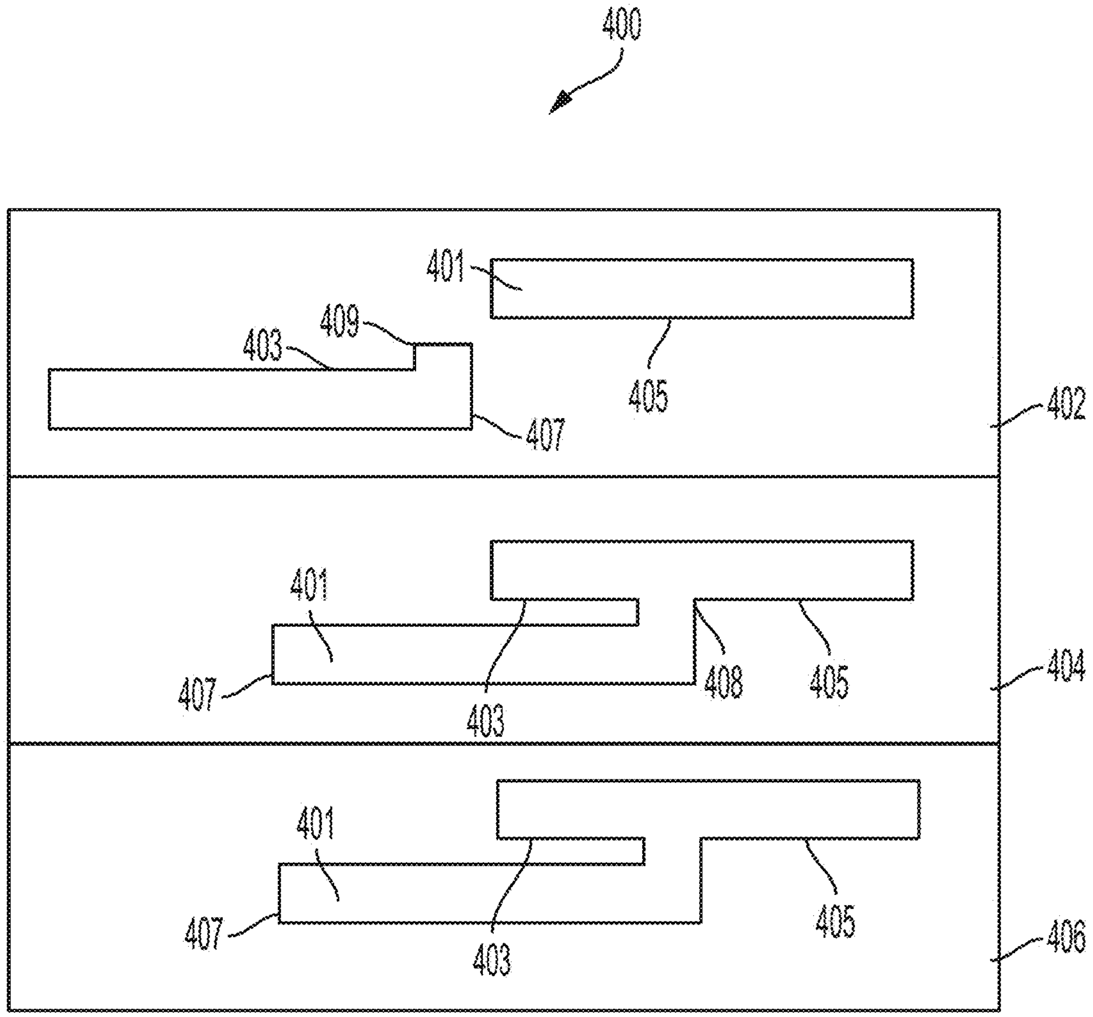
FIG. 4 is a schematic of electrical contacts of a wet-mate connector assembly in different states for coupling together, according to one example of the present disclosure

FIG. 4 is a schematic of electrical contacts of a wet-mate connector assembly 109 in different states for coupling together, according to one example of the present disclosure.

In block 402, a male electrical contact 407 and a female electrical contact 405 can include a valve metal alloy 401. The valve metal alloy 401 can form an insulation layer 403 in response to exposure to downhole fluids in a wellbore 102 in combination with an applied voltage. In the example depicted in FIG. 4, the male electrical contact 407 and the female electrical contact are each encapsulated by an insulation layer 403.

In block 404, the male electrical contact 407 and the female electrical contact 405 can experience mechanical contact while connecting. For example, a portion of the insulation layer 403 can be scraped off when the male electrical contact 407 mechanically engages with the female electrical contact 405. The male electrical contact 407 can scrape the insulation layer 403 off with a protrusion 409. This can expose a conductive portion of the male electrical contact 407 to a conductive portion of the female electrical contact 405. The male electrical contact 407 and the female electrical contact 405 can establish an electrical connection at their exposed conductive portions. Scraping off a portion of the insulation layer 403 can expose the valve metal alloy 401 to downhole fluids in the wellbore environment.

In block 406, the surface area of the valve metal alloy 401 that is exposed to the wellbore environment can recover its insulation layer 403. For example, the exposed portion of the valve metal alloy 401 can contact downhole fluids in the environment. The valve metal alloy may respond to the contact with the downhole fluids and the applied voltage by causing an oxidation reaction. The oxidation reaction can enable the exposed portion of the valve metal alloy 401 to form the insulation layer 403. For example, the oxidation reaction can transform the outermost layer of a niobium valve metal alloy into an insulation layer of niobium oxide. The unexposed portion 408 of the valve metal alloy 401 can couple the male electrical contact 407 with the female electrical contact 405. The unexposed portion 408 may not be exposed to the downhole fluids, and therefore, may not form an insulation layer 403. The unexposed portion 408 can complete an electrical connection between the male electrical contact 407 and the female electrical contact 405. The male electrical contact 407 and the female electrical contact 405 can be disconnected and reconnected without compromising the insulation resistance of the wet-mate connector assembly 109. The valve metal alloy can enable the male electrical contact 407 and the female electrical contact 405 to re-generate their respective insulation layers 403 during reconnections.

Figure 5:
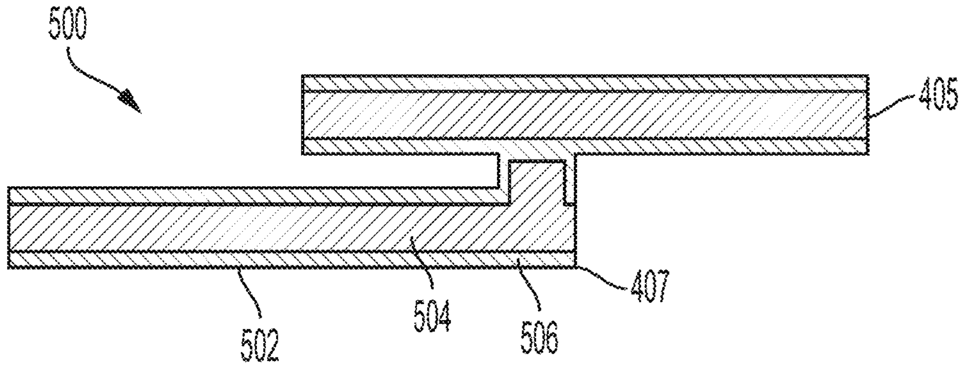
FIG. 5 is a diagram of electrical contacts of a wet-mate connector assembly according to one example of the present disclosure.

FIG. 5 is a diagram of a male electrical contact 407 and a female electrical contact 405 of a wet-mate connector assembly 500, according to one example of the present disclosure. The wet-mate connector assembly 500 can include an inner portion 504 that is made of a conductive material. The outside of the wet-mate connector assembly 500 can be coated with a valve metal alloy 506 that can react with surrounding brine in response to an electric charge to create an insulation layer 502. For example, the inner portion may be an inner core that can be encapsulated by the valve metal alloy 506. The valve metal alloy 506 can be encapsulated by the insulation layer 502. The conductive material can be the same as or different from the valve metal alloy 506. The conductive material of the inner portion 504 can provide increased conductivity for the female electrical contact 405 and the male electrical contact 407 in the wet-mate connector assembly 500. In some examples, the valve metal alloy 506 can be combined with layers of other metals with conductive properties to increase the overall conductivity of the wet-mate connector assembly 500.

Figure 6A:
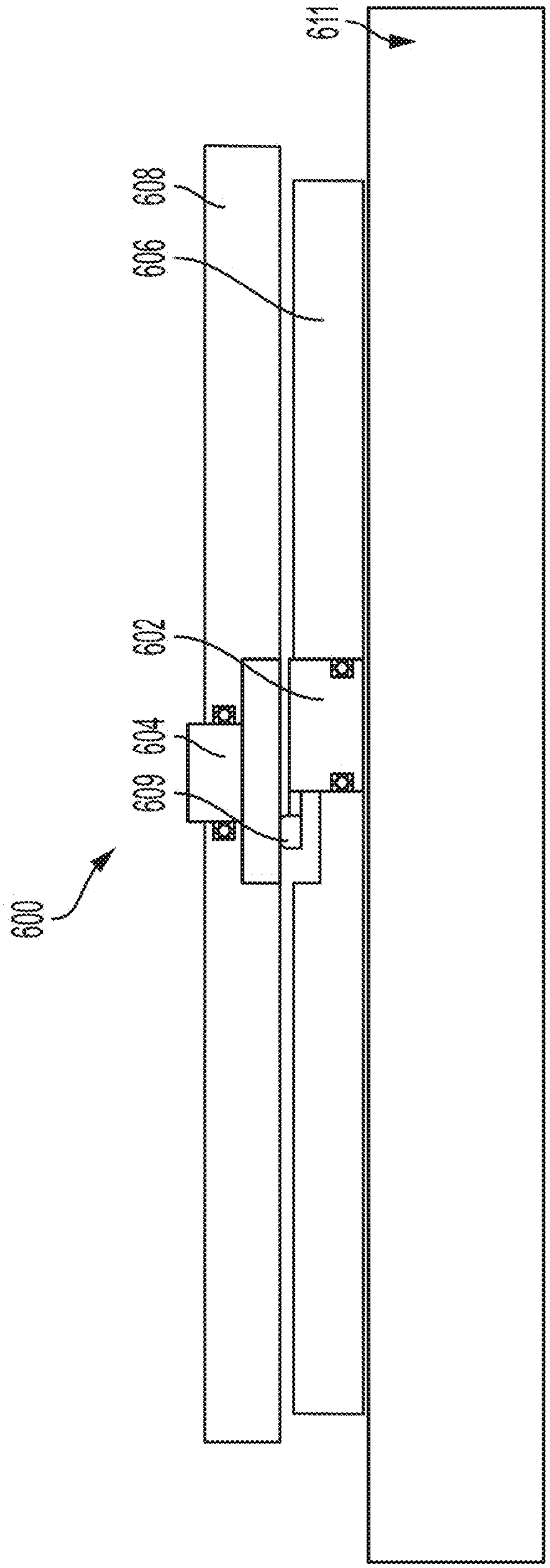
FIG. 6A is a sectional side view of a wet-mate connector assembly according to one example of the present disclosure.

FIG. 6A is a sectional side view of a wet-mate connector assembly 600 according to one example of the present disclosure. The wet-mate connector assembly 600 includes a male electrical contact 602 and a female electrical contact 604. The male electrical contact 602 may be housed in a male portion of the wet-mate connector assembly 600, and the female electrical contact may be housed in a female portion of the wet-mate connector assembly 600. The male electrical contact 602 can be encapsulated by an insulator band 606, and the female electrical contact 604 can be encapsulated by an insulator band 608. The male electrical contact 602 and the female electrical contact may include a valve metal alloy. The valve metal alloy can form an insulation layer in response to an applied voltage and contact with a downhole fluid. The male electrical contact 602 can include a protrusion 609 that can scrape off a portion of the insulation layer for exposing an un-insulated portion of the male electrical contact 602 with an un-insulated portion of the female electrical contact 604.

Figure 6B:
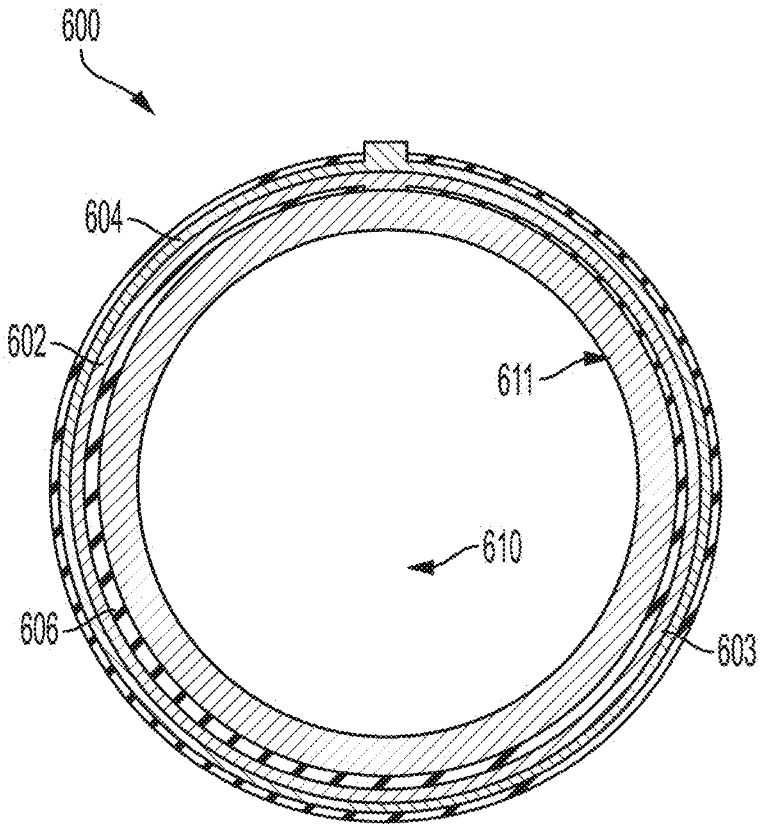
FIG. 6B is a cross-sectional diagram of the wet-mate connector assembly of FIG. 6A according to one example of the present disclosure.

FIG. 6B is a cross-sectional diagram of the wet-mate connector assembly 600 depicted in FIG. 6A, according to one example of the present disclosure. The male electrical contact 602 and the female electrical contact 604 can be concentric such that the male electrical contact 602 can be inserted into the female electrical contact 604. For example, an inner diameter of the female electrical contact 604 may be mechanically engaged with an outer diameter of the male electrical contact 602 for enabling an electrical current to flow between the male electrical contact 602 and the female electrical contact 604. The inner diameter of the female electrical contact 604 and the outer diameter of the male electrical contact 602 may define a contact chamber 603 where the mechanical engagement and electrical connection may occur.

Mechanically engaging the male portion of the wet-mate connector assembly 600 with the female portion of the wet-mate connector assembly 600 may also define a fluid flow path 610 in the center of the wet-mate connector assembly 600. The fluid flow path 610 may be encapsulated by the male connector mandrel 611. Produced wellbore fluids may flow through the fluid flow path 610. The male connector mandrel 611 can insulate the wet-mate connector assembly 600 from wellbore fluids flowing through the fluid flow path 610. In some examples, the male connector mandrel 611 may be a stretch of metal tubing that can run through a center of the wet-mate connector assembly 600 and can span the length of the wet-mate connector assembly 600. The male connector mandrel 611 may be connected to a first portion of a hydraulic line that can form a first fluid flow path from the male connector mandrel to a wellhead, and a second fluid flow path leading from the wellbore to the male connector mandrel.

Figure 7:
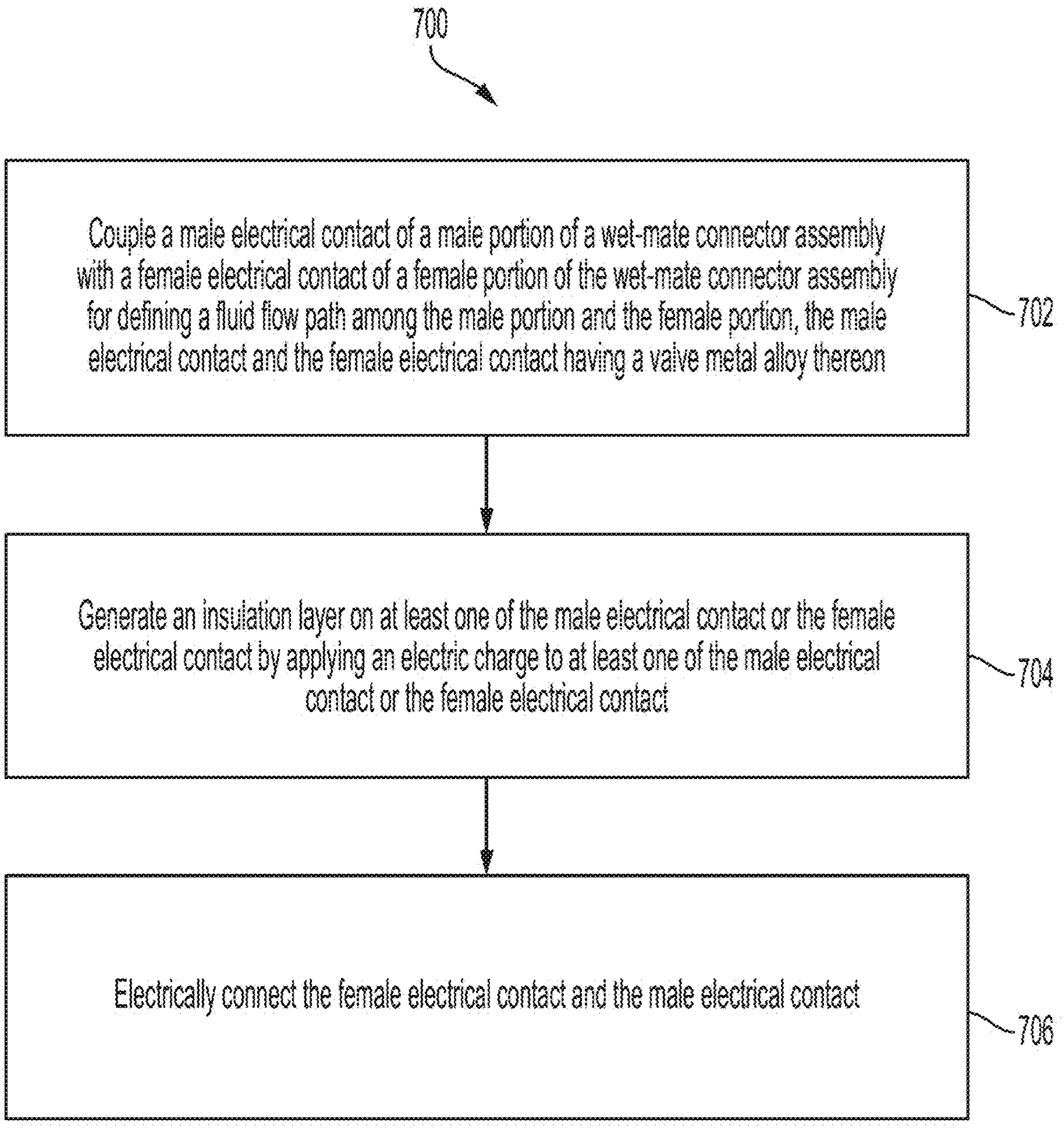
FIG. 7 is a flowchart of a process for electrically connecting the wet-mate connector assembly according to one example of the present disclosure.

FIG. 7 is a flowchart depicting a process 700 for electrically connecting the wet-mate connector assembly 109 according to one example of the present disclosure. The steps of FIG. 7 are described with reference to components of FIG. 3-4 and FIG. 6. At block 702, the process 700 involves coupling a male electrical contact 309*a* of a male portion 303 of a wet-mate connector assembly 109 with a female electrical contact 309*b* of a female portion 305 of the wet-mate connector assembly 109 for defining a fluid flow path 610 among the male portion 303 and the female portion 305, the male electrical contact 309*a* and the female electrical contact 309*b* having valve metal alloy 401 thereon. The fluid flow path 610 can run through a center of the wet-mate connector assembly 109, and can allow fluids to flow through the wet-mate connector assembly 109.

At block 704, the process 700 involves generating an insulation layer on at least one of the male electrical contact 309*a* or the female electrical contact 309*b* by applying an electric charge to at least one of the male electrical contact 309*a* or the female electrical contact 309*b*. The valve metal alloy 401 can react with downhole fluids to form an insulation layer 403. For example, the valve metal alloy 401 on the male electrical contact 309*a* or the female electrical contact 309*b* can react with downhole fluid and an electric charge to form the insulation layer 403. The insulation layer 403 can be an oxidized insulation layer 403 that can be generated via an oxidation reaction between an outermost layer of the valve metal alloy 401 and downhole fluids.

At block 706, the process 700 involves electrically connecting the female electrical contact 309*b* and the male electrical contact 309*a*. Electrically connecting the male electrical contact 309*a* and the female electrical contact can cause the valve metal alloy 401 to form the insulation layer on at least one of the male electrical contact 309*a* or the female electrical contact 309*b* in a downhole portion of a well.

In some examples, electrically connecting the female electrical contact 309*b* and the male electrical contact 309*a* can involve coupling the male electrical contact 309*a* and the female electrical contact 309*b* to contact screws 302. The contact screws 302 can be used to fasten the male electrical contact 309*a* and the female electrical contact 309*b* together. Fastening the male electrical contact 309*a* and the female electrical contact 309*b* together can increase the quality of the contact between the male electrical contact 309*a* and the female electrical contact 309*b*. Furthermore, fastening the male electrical contact 309*a* and the female electrical contact 309*b* together can increase a sealing pressure in a contact chamber 307 that may be defined between the male electrical contact 309*a* and the female electrical contact 309*b*. This can prevent an ingress of fluids into the contact chamber 307.

In some examples, electrically connecting the female electrical contact 309*b* and the male electrical contact 309*a* can involve scraping off portions of the insulation layer 403 that can be present on the male electrical contact 309*a* and the female electrical contact 309*b*. Scraping off portions of the insulation layer 403 can expose a conductive portion of the male electrical contact 309*a* to a conductive portion of the female electrical contact 309*b* for forming an electrical connection among the male electrical contact 309*a* and the female electrical contact 309*b*.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

In some aspects, apparatus, method, and system for a valve metal alloy that can form an insulation layer for insulating a wet-mate connector assembly are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a wet-mate connector assembly comprising: a male portion having a male electrical contact with a valve metal alloy thereon; and a female portion having a female electrical contact with the valve metal alloy thereon, the female portion configured to receive the male portion for defining a fluid flow path therein and to form an electrical connection with the male portion, wherein the valve metal alloy is configured to respond to an electrical charge and a downhole fluid by forming an insulation layer on at least one of the male electrical contact or the female electrical contact in a downhole of a well.

Example 2 is the wet-mate connector assembly of example(s) 1, wherein the insulation layer is an oxidized insulation layer that is generatable through an oxidation reaction between an outermost layer of the valve metal alloy and the downhole fluid.

Example 3 is the wet-mate connector assembly of example(s) 1-2, wherein the male portion and the female portion define a contact chamber, and wherein the wet-mate connector assembly further comprises an insulator band that is configured to insulate the wet-mate connector assembly.

Example 4 is the wet-mate connector assembly of example(s) 1-3, wherein the valve metal alloy comprises at least one of tantalum, niobium, niobium oxide, an electrically conductive ceramic, or niobium pentoxide.

Example 5 is the wet-mate connector assembly of example(s) 1-4, wherein the male electrical contact and the female electrical contact are concentric.

Example 6 is the wet-mate connector assembly of example(s) 1-5, wherein the male electrical contact further comprises a protrusion configurable to scrape off a portion of the insulation layer on the female electrical contact and the male electrical contact for exposing a first conductive portion of the female electrical contact to form the electrical connection with a second conductive portion of the male electrical contact.

Example 7 is the wet-mate connector assembly of example(s) 1-6, wherein the male portion and the female portion each comprise: an inner core comprising a conductive material; and an outer shell surrounding the inner core and comprising the valve metal alloy.

Example 8 is a method comprising: coupling a male electrical contact of a wet-mate connector assembly in a downhole portion of a wellbore with a female electrical contact of the wet-mate connector assembly, the male electrical contact and the female electrical contact defining a fluid flow path and having a valve metal alloy thereon; generating an insulation layer on at least one of the male electrical contact or the female electrical contact by applying an electric charge to at least one of the male electrical contact or the female electrical contact; and electrically connecting the female electrical contact and the male electrical contact.

Example 9 is the method of example(s) 8, wherein electrically connecting the female electrical contact and the male electrical contact further comprises: scraping off a portion of the insulation layer to expose a first conductive portion of the female electrical contact to a second conductive portion of the male electrical contact; and electrically connecting the female electrical contact and the male electrical contact via the first conductive portion and the second conductive portion.

Example 10 is the method of example(s) 9, wherein scraping off the portion of the insulation layer further comprises scraping off the portion of the insulation layer with a protrusion on the male electrical contact.

Example 11 is the method of example(s) 8-10, wherein generating the insulation layer further comprises: generating the insulation layer via an oxidation reaction between an outermost layer of the valve metal alloy, the electric charge, and a downhole fluid.

Example 12 is the method of example(s) 8-11, wherein the valve metal alloy comprises at least one of tantalum, niobium, niobium oxide, an electrically conductive ceramic, niobium pentoxide.

Example 13 is the method of example(s) 8-12, wherein the male electrical contact and the female electrical contact are concentric.

Example 14 is the method of example(s) 8-13, further comprising insulating the male electrical contact and the female electrical contact with at least one insulator band.

Example 15 is the method of example(s) 8-14, further comprising, in response to a removal of a portion of the insulation layer, re-generating the insulation layer on an exposed portion of the valve metal alloy.

Example 16 is a system comprising: a control line positionable in a wellbore and a wet-mate connector assembly couplable with the control line and positionable in a downhole portion of the wellbore, the wet-mate connector assembly comprising: a male portion having a male electrical contact with a valve metal alloy thereon; and a female portion having a female electrical contact with the valve metal alloy thereon, the female portion configured to receive the male portion for defining a fluid flow path therein and to form an electrical connection with the male portion, wherein the valve metal alloy is configured to respond to an electrical charge and a downhole fluid by forming an insulation layer on at least one of the male electrical contact or the female electrical contact in a downhole of a well.

Example 17 is the system of example(s) 16, wherein the insulation layer is an oxidized layer that is generatable through an oxidation reaction between an outermost layer of the valve metal alloy, the electric charge, and the downhole fluid.

Example 18 is the system of example(s) 16-17, wherein the male electrical contact and the female electrical contact are concentric.

Example 19 is the system of example(s) 16-18, wherein the valve metal alloy comprises at least one of tantalum, niobium, niobium oxide, an electrically conductive ceramic, niobium pentoxide.

Example 20 is the system of example(s) 16-19, wherein the male portion and the female portion comprise: an inner core comprising a conductive material; and an outer shell surrounding the inner core and comprising the valve metal alloy.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A wet-mate connector assembly comprising:

a male portion having a male electrical contact with a valve metal alloy thereon; and a female portion having a female electrical contact with the valve metal alloy thereon, the female portion configured to receive the male portion for defining a fluid flow path therein and to form an electrical connection with the male portion, wherein the valve metal alloy is configured to respond to an electrical charge and a downhole fluid by forming an insulation layer on at least one of the male electrical contact or the female electrical contact in a downhole of a well.

2. The wet-mate connector assembly of claim 1, wherein the insulation layer is an oxidized insulation layer that is generatable through an oxidation reaction between an outermost layer of the valve metal alloy and the downhole fluid.

3. The wet-mate connector assembly of claim 1, wherein the male portion and the female portion define a contact chamber, and wherein the wet-mate connector assembly further comprises an insulator band that is configured to insulate the wet-mate connector assembly.

4. The wet-mate connector assembly of claim 1, wherein the valve metal alloy comprises at least one of tantalum, niobium, niobium oxide, an electrically conductive ceramic, or niobium pentoxide.

5. The wet-mate connector assembly of claim 1, wherein the male electrical contact and the female electrical contact are concentric.

6. The wet-mate connector assembly of claim 1, wherein the male electrical contact further comprises a protrusion configurable to scrape off a portion of the insulation layer on the female electrical contact and the male electrical contact for exposing a first conductive portion of the female electrical contact to form the electrical connection with a second conductive portion of the male electrical contact.

7. The wet-mate connector assembly of claim 1, wherein the male portion and the female portion each comprise:

an inner core comprising a conductive material; and an outer shell surrounding the inner core and comprising the valve metal alloy.

8. A method comprising:

coupling a male electrical contact of a wet-mate connector assembly in a downhole portion of a wellbore with a female electrical contact of the wet-mate connector assembly, the male electrical contact and the female electrical contact defining a fluid flow path and having a valve metal alloy thereon;

generating an insulation layer on at least one of the male electrical contact or the female electrical contact by applying an electric charge to at least one of the male electrical contact or the female electrical contact; and electrically connecting the female electrical contact and the male electrical contact.

9. The method of claim 8, wherein electrically connecting the female electrical contact and the male electrical contact further comprises:

scraping off a portion of the insulation layer to expose a first conductive portion of the female electrical contact to a second conductive portion of the male electrical contact; and electrically connecting the female electrical contact and the male electrical contact via the first conductive portion and the second conductive portion.

10. The method of claim 9, wherein scraping off the portion of the insulation layer further comprises scraping off the portion of the insulation layer with a protrusion on the male electrical contact.

11. The method of claim 8, wherein generating the insulation layer further comprises:

generating the insulation layer via an oxidation reaction between an outermost layer of the valve metal alloy, the electric charge, and a downhole fluid.

12. The method of claim 8, wherein the valve metal alloy comprises at least one of tantalum, niobium, niobium oxide, an electrically conductive ceramic, niobium pentoxide.

13. The method of claim 8, wherein the male electrical contact and the female electrical contact are concentric.

14. The method of claim 8, further comprising insulating the male electrical contact and the female electrical contact with at least one insulator band.

15. The method of claim 8, further comprising, in response to a removal of a portion of the insulation layer, re-generating the insulation layer on an exposed portion of the valve metal alloy.

16. A system comprising:

a control line positionable in a wellbore and a wet-mate connector assembly couplable with the control line and positionable in a downhole portion of the wellbore, the wet-mate connector assembly comprising:

a male portion having a male electrical contact with a valve metal alloy thereon; and a female portion having a female electrical contact with the valve metal alloy thereon, the female portion configured to receive the male portion for defining a fluid flow path therein and to form an electrical connection with the male portion, wherein the valve metal alloy is configured to respond to an electrical charge and a downhole fluid by forming an insulation layer on at least one of the male electrical contact or the female electrical contact in a downhole of a well.

17. The system of claim 16, wherein the insulation layer is an oxidized layer that is generatable through an oxidation reaction between an outermost layer of the valve metal alloy, the electric charge, and the downhole fluid.

18. The system of claim 16, wherein the male electrical contact and the female electrical contact are concentric.

19. The system of claim 16, wherein the valve metal alloy comprises at least one of tantalum, niobium, niobium oxide, an electrically conductive ceramic, niobium pentoxide.

20. The system of claim 16, wherein the male portion and the female portion comprise:

an inner core comprising a conductive material; and an outer shell surrounding the inner core and comprising the valve metal alloy.

* * * * *